United States Patent
Klein

[15] 3,667,002
[45] May 30, 1972

[54] STRIP CONFIGURATION FOR CAPACITORS

[72] Inventor: Gerhart P. Klein, Manchester, Mass.

[73] Assignee: P. R. Mallory & Co., Inc., Indianapolis, Ind.

[22] Filed: June 1, 1970

[21] Appl. No.: 54,066

Related U.S. Application Data

[62] Division of Ser. No. 722,702, Apr. 19, 1968, Pat. No. 3,530,342.

[52] U.S. Cl. ............................................. 317/230, 317/242
[51] Int. Cl. .................................................... H01g 9/05
[58] Field of Search ................................. 317/230, 231, 233

[56] References Cited

UNITED STATES PATENTS

| | | | |
|---|---|---|---|
| 2,733,389 | 1/1956 | Ellison | 317/230 |
| 2,743,400 | 4/1956 | Bujan | 317/230 |
| 3,325,699 | 1/1967 | Hellicar | 317/230 |
| 3,403,303 | 9/1968 | Klein | 317/230 |

Primary Examiner—James D. Kallam
Attorney—Richard H. Childress and Robert F. Meyer

[57] ABSTRACT

The present invention relates to a configuration which is an integral part of the anode structure of an electrolytic capacitor. A strip of film-forming metal includes at least one appendage which has formed therein a depression which serves as the retaining means for a bonded mass of film-forming metal. The appendage also includes a reduced neck portion. The appendage and the mass of film-forming metal have an oxide layer, a semiconductor layer and a conductive layer formed thereover. Terminal means includes one extremity having a bent end portion connected to the reduced neck portion and includes another extremity having a substantially flatten end portion connected to the conductive layer carried by the bonded mass of film-forming metal.

10 Claims, 6 Drawing Figures

Patented May 30, 1972

3,667,002

INVENTOR
GERHART P. KLEIN
BY
Henry W. Cummings
ATTORNEY

STRIP CONFIGURATION FOR CAPACITORS

This is a division of application Ser. No. 722,702, filed Apr. 19, 1968, now U.S. Pat. No. 3,530,342.

Solid electrolyte capacitors may be manufactured using any one of several techniques. For example, a film-forming metal powder selected from the group consisting of tantalum, niobium, hafnium, zirconium, aluminum and titanium may be pressed into the desired configuration having the desired density and then sintered so as to provide a porous anode slug or pellet. The anode slug may be prepared using a mixture of the film-forming metal powder and a binder such as stearic acid or the like. The binder is used to hold the compressed particles together until sintering of the particles has been initiated. During sintering of the compact, the stearic acid is evaporated without leaving harmful impurities on or in the compact. Sintering bonds the individual film-forming metal particles together so as to form a slug having a myraid of intercommunicating voids. An oxide film may be formed on the film-forming metal using any known electroformation method. The oxide film serves as the dielectric for the electrolytic capacitor. In the case of a tantalum slug, the oxide film is tantalum oxide ($Ta_2O_5$). The oxide film coated slug may be dipped into a solution of a material such as manganeous nitrate which may be pyrolytically converted to a semiconductive material such as manganese dioxide which substantially overlies the dielectric oxide film. The manganese dioxide layer functions as the counter electrode (cathode) of the capacitor. The step of forming the oxide film dielectric layer and/or the steps of forming the manganese dioxide semiconductive layer on the slug may be repeated as many times as is necessary to achieve a capacitor having the desired electrical characteristics. The slug may be dipped into a solution containing a suitable contact material such as a colloidal dispersion of graphite in water or the like and may be suitably cured by heating at an elevated temperature in an oven. The last mentioned step is performed in order to provide a graphite layer over the semiconductor layer on at least the end of the slug removed from the anode riser. Silver "paint" may be applied over the graphite layer and suitably cured by heating at an elevated temperature in an oven. Thereafter, the slug may be dipped into molten solder and the molten solder allowed to cool. The slug is placed in a suitable container or housing generally having an open end and a closed end. The end of the slug coated with solder may be suitable attached to the casing by any suitable means such as solder and the like. The open end of the container may be closed with a suitable end seal such as an hermetic glass-to-metal seal, gasket seal or the like.

The coated slug may be encapsulated in a plastic material by generally accepted plastic encapsulation processing techniques such as by dipping, transfer molding, injection molding and the like.

It is known that solid electrolyte capacitors may be fabricated using a substantially continuous fabricating process. The substantially continuous process used to fabricate the capacitors may be any one of several different processes. The continuous fabrication process referred to in the said application is generally known as the "powder on foil" process. The "powder on foil" process was conceived and developed to substantially eliminate handling problems experienced during the fabrication of small, solid electrolyte capacitors. The "powder on foil" process described in the said application significantly reduces the handling required during fabrication of the capacitors when compared to the handling required during the fabrication of solid electrolyte capacitors using pressed anode slugs. Also, it was found that the elimination of the binder used to hold the mass of metal together prior to sintering and the elimination of the pressing step improved the quality of the solid electrolyte capacitor.

The "powder on foil" process consists essentially of forming a substantially continuous foil strip of film-forming metal into the desired configuration, depositing a moistened mass of film-forming metallic powder on the foil strip and sintering the moistened mass of metallic powder in situ to form a porous pellet connected to the foil strip. The pellet, of course, is the anode of the capacitor. The pellet is further processed so as to be provided with a cathode terminal thereby completing the capacitor unit. It should be seen that the "powder on foil" technique substantially reduces the amount of handling required during fabrication of the capacitor, substantially eliminates contamination which may occur during handling and substantially minimizes the possibility of structural damage occurring to the capacitor during fabrication by eliminating the steps of adding binders to the powder prior to sintering and pressing of the mass of powder.

The use of a moistened mass of film-forming metal powder has several advantages, among which is that the moistened powder flows drop wise from a suitable dispenser thereby facilitating the dispensing of the moistened mass of powder in controlled amounts. Another advantage of the above-mentioned process is that the dispensed moistened mass of film-forming metal powder has a significantly reduced volume when compared to the volume of the dry film-forming metal powder, thereby providing a green compact having a sufficiently high density without subjecting the mass of film-forming metal powder to a compacting step.

It was found, however, that if the portion of the strip of film-forming metal foil, that is, the appendage, carrying the mass of powder is displaced with respect to the remaining portion of the strip of metal damage to the capacitor may result. Also, alignment of the terminal means with respect to the appendage, at times, proved difficult.

Therefore, it is an object of the present invention to provide a film-forming metal foil strip means including at least one appendage for use in electrolyte capacitor which overcomes the above-mentioned problems.

A further object of the present invention is to provide a method for fabricating miniature capacitor components using automated techniques.

Another object of the present invention is to provide a hairpin terminal means for use with a film-forming metal foil strip having at least one appendage which is carried by the foil strip.

Yet another object of the present invention is to provide a foil strip having at least one appendage and having means for providing alignment of terminal means with the cooperatively associated appendage.

A further object of the present invention is to provide, during the manufacture of an electrolyte capacitor, foil strip means which carry the terminal lead means of the capacitor and wherein the terminal lead means serve in assisting the positioning of the capacitor within a mold cavity prior to encapsulation of the capacitor.

Another object of the present invention is to provide a capacitor utilizing hairpin terminal means which substantially prevents displacement of the capacitor within the confines of a mold cavity during the molding of a housing about the capacitor thereby providing a molded housing having a substantially uniform thickness about the capacitor.

Yet another object of the present invention is to provide cup-shaped means of film-forming metal foil strip carrying a bonded mass of film-forming metal powder having a myriad of intercommunicating voids which includes a reduced neck portion and means to support a selected region of the neck portion thereby substantially preventing deformation of the strengthened region of the reduced neck portion with respect to cup-shaped means during processing at various work stations which may lead to damage of the completed capacitor.

A further object of the present invention is to provide a film-forming metal foil strip means which includes at least one aperture having a substantially continuous side wall at substantially a right angle therewith so as to increase the mechanical strength of the aperture without a corresponding increase in the physical thickness of the foil strip means.

Another object of the present invention is to provide a film-forming metal foil strip having a plurality of appendages which is automatically indexed under the desired work station.

Still another object of the present invention is to provide a foil strip configuration of film-forming metal for use in the fabrication of an electrolytic capacitor which includes a specially designed neck portion which reduces damage thereto during fabrication of the capacitor.

Yet another object of the present invention is to provide a foil strip of film-forming metal including cup-like means which are substantially rectangular-shaped so as to make most efficient use of a rectangular housing used to encapsulate the capacitor.

A further object of the present invention is to provide a foil strip of film-forming metal including cup-like means connected to the foil strip by a reduced neck portion for an electrolytic capacitor wherein the positive lead therefore is bent over and welded to the narrow part of the neck configuration associated with the strip configuration.

With the aforementioned objects enumerated, other objects relevant to the present invention will be apparent to those persons possessing ordinary skill in the art. Other objects of the present invention will appear in the following description, appended claims and appended drawings. The invention resides in the novel construction, combination, arrangement and cooperation of elements as hereinafter described and, more particularly, as defined in the appended claims.

The appended drawings illustrate embodiments of the present invention constructed to function in an advantageous mode devised for the practical application of the basic principles in the hereinafter described invention.

Generally speaking, the present invention relates to the means and methods of fabricating miniature capacitors. A cup-shaped means includes a depression for retaining bonded mass a film-forming metal particles. A reduced neck portion is integrally connected to the cup-shaped means. Terminal means including at least one bent over anode lead is attached to the reduced neck portion. The region of attachment of the anode lead to the reduced neck portion is spaced from the cup-shaped means.

Figure 1:
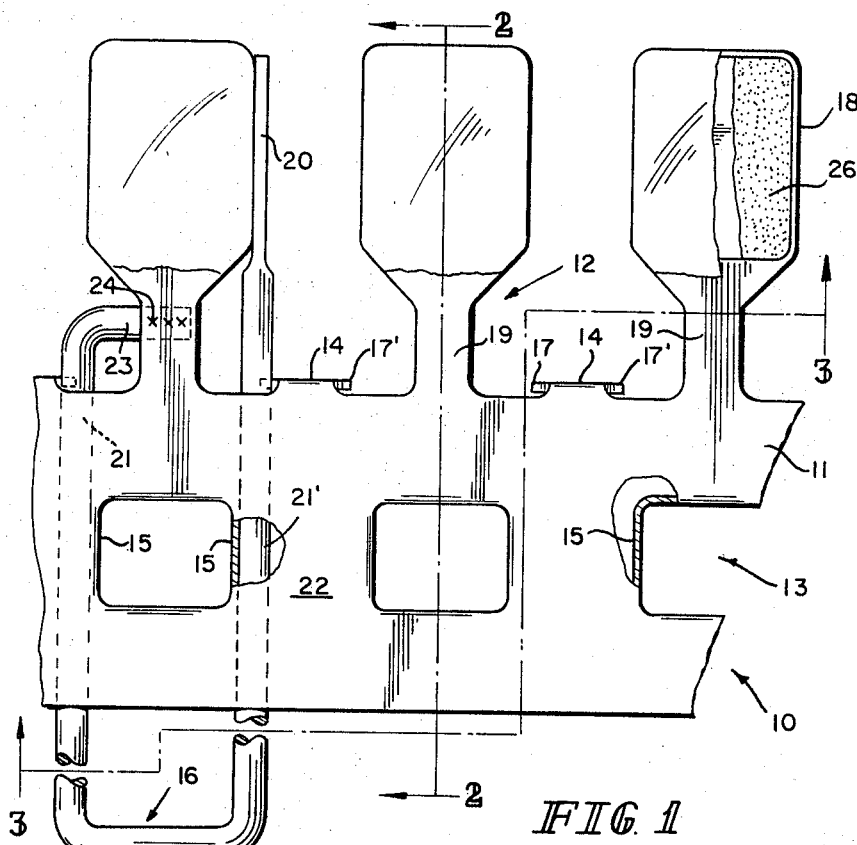
FIG. 1 is an enlarged partial top view of a foil strip means of film-forming metal including integral appendages illustrating the position of hairpin terminal means with respect to the cooperatively associated appendage and the retention and alignment thereof with respect to the appendage by means carried by the foil strip.

Referring now to the enlarged top view illustrated in FIG. 1 of the drawings, strip 10 of the film-forming metal foil includes base 11 and a plurality of appendages 12. The film-forming metal used to fabricate the strip and appendages is selected from the group consisting of tantalum, aluminum, niobium, hafnium, zirconium, titanium and the like. The base 11 of film-forming metal is preferably provided with a series of substantially equally spaced pilot apertures or perforations 13 which permit indexing of the strip material to and through the individual work stations as well as providing a convenient means by which the strip material may be advanced before and after each operational cycle performed on the cup-shaped members 18 of the appendage at the work stations. The apertures are illustrated as being substantially rectangular in shape. However, the shape and size of the apertures depend on, among other things, the shape and size of the sprocket means used to drive the strip material. Round apertures and rectangular apertures with or without an eyelet or side walls 15 and 15' may be used. Rectangular apertures with eyelets or side walls are preferred in order to give the strip additional strength which enables the foil strip to be wound on appropriate reel type devices and facilitate accurate indexing of the foil strip and the appendages to and through the stations at which work is to be performed on the foil strip and appendage.

The strip material 10 may be provided with a plurality of spaced, transversely aligned longitudinal extending means 14 disposed substantially intermediate successive pilot apertures 13. The extending means each include an angulated side 17 and 17' at each extremity thereof. Between each of the sides 15 and 15' of the aperture 13 and the projecting means 14 there is formed a receiving channel for the hairpin terminal means 16. It should be seen that the sides of 15 and 15' of the aperture and the angulated sides 17 and 17' of the extending means 14 cooperate to position and retain the hairpin terminal means 16. The extending means accurately positions and substantially fixedly retains the hairpin means with respect to the cooperatively associated cup-shaped means. The extending means are illustrated as tabs formed from the foil strip and bent at a substantially right angle with respect to the foil strip and thereby serve the function of assisting in the positioning and in the rotation of the hairpin lead in its desired location with respect to the cooperatively associated cup-shaped means.

The shape of the film-forming metal foil strip and the appendage integrally formed therewith is, in part, determined by the shape of the housing used to encapsulate the capacitor. In the embodiment shown in he figures of the drawings, the rectangular-shape cups 18 may be pressed into the film-forming metal foil by using a suitable die which simultaneously cuts the foil into suitable size, forms the desired configuration of the cup-shaped means, and forms the unit outline. For illustrative purposes only and not for purposes of limiting the present invention, two mil thick foil is cut into appendages having a reduced neck portion and a rectangular cup-shaped means. The rectangular cup-shaped means has a length of about 150 mils, a width of about 120 mils and a depth of about 10 mils. The center distance between individual cups is about 200 mils.

The cup-shaped portion 18 is used to carry the mass of bonded film-forming metal particles. The rectangular-shaped cup appears to make most efficient use of the available space in a rectangular type of housing. The foil carrying the mass of metal powder is cup-shaped for it is believed that it would otherwise be difficult to retain droplets of moistened metal powder within a selected area. The drops of moistened metal should be retained within a selected area so that the portion of the strip containing each of the droplets may separate from each other accurately and conveniently and so that each resultant capacitor has substantially the same capacitance rating. Further, the moistened powder tends to run over the edges of a flat appendage if the appendage does not contain an area thereof which acts as a confining means for the moistened mass of film-forming metal powder.

Each appendage also includes a reduced neck portion 19 which connects the cup-shaped means to the base of the foil strip. With the above recited dimensions of the rectangular cup-shaped means in mind, the reduced neck portion is gradually reduced in width from about 120 mils to about 40 mils a distance of about 40 mils from he cup-shaped means. The total length of the reduced neck portion is about 140 mils. It should be seen that the gradual reduction of the neck portion extends about two-sevenths of the total length of the neck portion and that the neck portion is reduced to about one-third of is width at the rectangular shaped cup.

The neck portion of the device is designed in such a manner so that any displacement of the appendage or appendages with respect to the base of the metal foil strip does not result in a defective capacitor. The danger of displacement of the appendage with respect to the main body of the foil strip is particularly acute during attachment of the terminal means 16 to the appendage and in the molding steps. The foil is shaped in such a way that the neck portion immediately adjacent to the cup-shaped mean is stronger than the neck portion adjacent to the base of the foil strip. Using the dimensions given as illustrated in the present invention, the area of flexing is encouraged to take place 40 mils removed from the cup-shaped means.

If the end of the terminal means is connected too close to the cup, the heat associated with connecting the end of the lead to the neck portion may be sufficient to cause the oxide film to be partially or totally destroyed. Therefore, the terminal means has an end connected to the narrow portion of the neck far enough from the neck to prevent damage to the capacitor body.

The hairpin terminal means 16 includes one extremity 20 which is flattened so as to provide intimate contact with the contact layer (not shown) formed on the bonded film-forming metal mass 26 disposed in the cup 18 of the appendage 12. The hairpin terminal means includes elongated sections 21 and 21' which engage the angulated sides 17 and 17' respectively of the extending means 14 and engages with the side walls 15 and 15' respectively of the rectangular aperture 13. For example, the elongated section 21' of the hairpin terminal means engages with a side wall 15' of the aperture 12 and an angulated side 17' of extending means 14. It should be seen that the hairpin means is restrained from horizontal and vertical displacement by the cooperative association existing between the angulated side 17' of the extending means 14, and side wall 15' of aperture 13, and the flat portion 22 of the foil strip.

Figure 3:
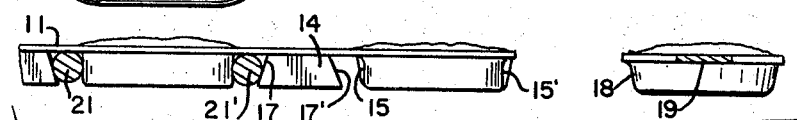
FIG. 3 is a cross-sectional view taken across the lines 3—3 of FIG. 1, illustrating means used to position and retain said hairpin terminal means during processing of the foil strip.

The hairpin terminal means also includes substantially U-shaped segment 13 located approximately mid-way between the terminal ends. The hairpin means may include a bent over extremity 23 which is welded to the reduced neck portion 19 of the cup-shaped means at 24. The extremity 23 of the hairpin means may be substantially straight if the indexing apertures 13 and the extending means 14 are displaced slightly from their positions illustrated in FIGS. 1 and 3.

Figure 2:
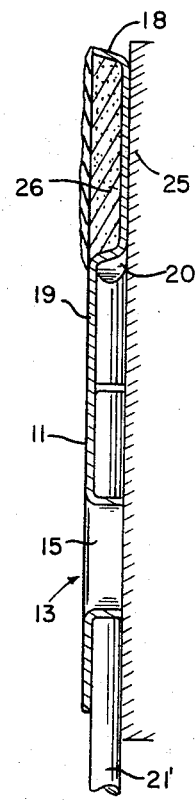
FIG. 2 is a side view of the foil strip and appendage taken across the lines 2—2 of FIG. 1, illustrating the reinforced section of an aperture and means used to support the neck portion of the appendage.

Referring now to FIG. 2 of the drawing, it should be seen that the side walls 15 and 15' of aperture 12 support the film-forming metal base 11 during processing through the various work stations. The extending means 14 and the side walls 15 and 15' of the aperture 12 are used to maintain the film-forming metal foil on a plane substantially parallel with guide means 25 positioned below the film-forming metal foil strip.

Figure 4:
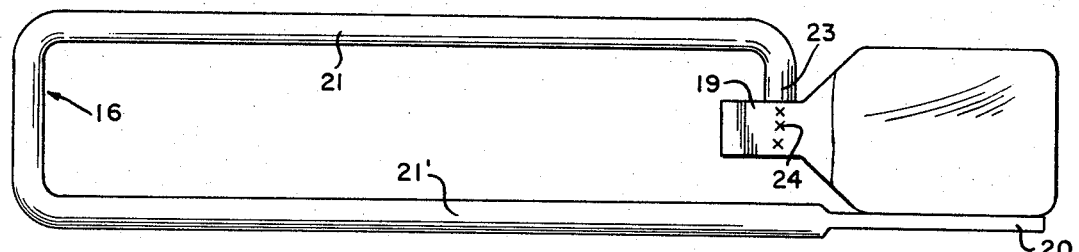
FIG. 4 illustrates said hairpin terminal means having a bent over end connected to the reduced neck portion of the appendage and a flatten end connected to the contact layer carried by the cup-shaped member of the appendage.

FIG. 4 shows the appendage consisting of the cup-shaped means and the reduced neck portion removed from the film-forming metal foil base 11. The cup-shaped means and reduced neck portion may be removed from the foil base by any suitable cutting means such as a knife cutter (not shown) or the like. FIG. 4 also shows that the bent end portion of the hairpin terminal mean is welded to the reduced neck portion of the cup-shaped means at a point substantially removed from the rectangular cup-shaped means so that heat from the welding strip does not degrade the oxide film on the cup-shaped means. The flattened end 20 of the hairpin terminal means is connected to the contact layer formed on the film-forming metal by any suitable means such as solder or the like.

Figure 5:
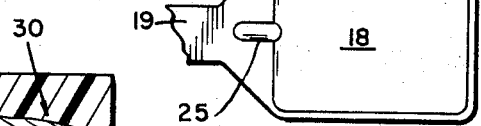
FIG. 5 is a partial top view of the appendage illustrating reinforcing rib means carried by the reduced neck portion to thereby strengthen the reduced neck portion.

Rib means 25 shown in FIG. 5 may be embossed in the neck portion of the appendage to further strengthen the are of the reduced neck portion of the appendage so that flexing thereof, if any, occurs in an area removed from the cup-shaped portion of the foil means.

Figure 6:
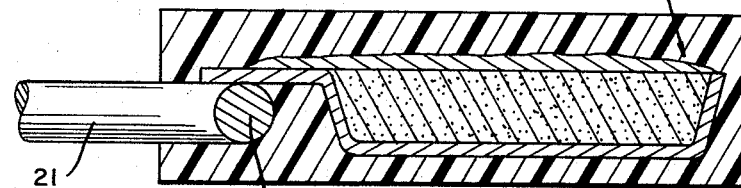
FIG. 6 is a cross-sectional view of the capacitor device illustrating encapsulation of the capacitor device.

FIG. 6 shows capacitor body 30 encapsulated in a suitable resilient or elastomeric housing means 31. The capacitor body includes the cup-shaped means, the reduced neck portion, the hairpin terminal means, a dielectric oxide layer, a semiconductor layer and a contact layer. The housing means is molded directly to the capacitor body by any suitable molding technique such as injection molding or transfer molding. The material of the housing may be selected from any suitable thermosetting or thermoplastic material such as for example, silicone rubber, epoxy, polycarbonate, phenolic or the like. The hairpin terminal means of FIG. 4 is used for several functions other than the functions enumerated above. An additional function of the terminal means is accurately position the capacitor body within the mold means (not shown). In addition, the terminal means is used to provide added strength to the capacitor body so that it is not displaced within the molded cavity by the introduction of molten material into the cavity. After the capacitor has been removed from the hold, the hairpin terminal lead is severed in such a manner so as to form two separate and distinct leads so as to provide an anode lead and a cathode lead. The lead connected to the reduced neck portion is the anode lead and the lead connected to the contact layer is the cathode lead.

The present invention is not intended to be limited to the disclosure herein and changes and modifications may be made in the disclosure by those skilled in the art without departing from the spirit and scope of the novel concepts of this invention. Such modifications and variations are considered to be within the purview and scope of this invention and the appended claims.

Having thus described my invention, I claim:

1. In a capacitor, having a mass of bonded film-forming metal powders with a myriad of intercommunicating voids, a metal oxide layer formed over the surface of said metal powders, a semiconductor electrolyte layer formed over the said metal oxide layer, a contact layer formed over the electrolyte layer, and a housing encapsulating said capacitor; the improvement comprising; a cup-shaped means including a depression containing said mass of bonded film-forming metal powders, said mass being integrally bonded to said cup-shaped means, a neck portion integrally connected to and projecting from the cup-shaped means, and terminal means including at least one anode lead attached to said neck portion at a location spaced from said cup-shaped means, and said terminal means including at least one cathode lead attached to said contact layer.

2. In the capacitor of claim 1, wherein said anode lead includes a bent over portion attached to said neck portion.

3. In the capacitor of claim 1, further including means for strengthening said neck portion between said cup-shaped means and the area where said anode lead means is attached to said reduced neck portion.

4. In the capacitor of claim 3, wherein said means for strengthening said neck portion is a gradual reduction for the width of said neck portion starting at said cup-shaped means.

5. In the capacitor of claim 4, wherein the gradual reduction of said neck portion is confined to about the initial two-sevenths of the entire length of said neck portion.

6. In the capacitor of claim 4, wherein said means for strengthening said neck portion further includes rib means which extends the length of said gradual reduction of said width of said neck portion.

7. In the capacitor of claim 1, wherein the cup-shaped means is substantially rectangular-shaped.

8. In the capacitor of claim 7, wherein the anode attachment is along substantially the entire longitudinal length of one side of said rectangular-shaped cup means.

9. In the capacitor of claim 7, wherein said film-forming metal of said cup means and said mass of bonded film-forming metal particles is the same.

10. In the capacitor of claim 9, wherein film-forming metal is selected from the group consisting of tantalum, aluminum, titanium, niobium, hafnium and zirconium.

* * * * *